(12) United States Patent
Toillon et al.

(10) Patent No.: US 11,664,885 B2
(45) Date of Patent: May 30, 2023

(54) COMMUNICATIONS NETWORK

(71) Applicant: SAFRAN ELECTRONICS & DEFENSE, Boulogne Billancourt (FR)

(72) Inventors: Patrice Toillon, Boulogne Billancourt (FR); Francois Guillot, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 80 days.

(21) Appl. No.: 16/077,953

(22) PCT Filed: Feb. 8, 2017

(86) PCT No.: PCT/EP2017/052784
§ 371 (c)(1),
(2) Date: Aug. 14, 2018

(87) PCT Pub. No.: WO2017/140560
PCT Pub. Date: Aug. 24, 2017

(65) Prior Publication Data
US 2019/0207670 A1    Jul. 4, 2019

(30) Foreign Application Priority Data

Feb. 19, 2016    (FR) ...................... 16 51381

(51) Int. Cl.
*H04B 7/185*    (2006.01)
*H04L 29/08*    (2006.01)
(Continued)

(52) U.S. Cl.
CPC ... *H04B 7/18506* (2013.01); *H04L 12/40039* (2013.01); *H04L 41/0213* (2013.01);
(Continued)

(58) Field of Classification Search
None
See application file for complete search history.

(56) References Cited

U.S. PATENT DOCUMENTS 8,570,192 B2 * 10/2013 McLoughlin .......... B64D 45/00
340/973
9,137,038 B1 * 9/2015 Mazuk .................... G06F 13/40
(Continued)

FOREIGN PATENT DOCUMENTS

EP    2 793 431 A1    10/2014
EP    2793431 A1 * 10/2014    ............... H04L 5/14

OTHER PUBLICATIONS

Ian Land et al., "Architecting ARINC 664, Part 7 (AFDX) Solutions", XILINX, Application Note: Virtex-4 and Virtex-5 FPGAs; May 22, 2009, pp. 1-24, V1.0.1.

*Primary Examiner* — Jeffrey M Rutkowski
*Assistant Examiner* — Mehedi S Aley
(74) *Attorney, Agent, or Firm* — Muncy, Geissler, Olds & Lowe, P.C.

(57) ABSTRACT

The invention relates to a communication network for an aircraft comprising at least one processing member and a first switch which is connected to the first processing member in order to provide data exchange within the first processing member and/or between the first processing member and at least one user terminal remote from the first processing member and connected to the first switch. According to the invention, the first switch comprises local means for observing logical communication channels of the first switch, and the first processing member includes means for controlling said observation means.

18 Claims, 2 Drawing Sheets

(51) Int. Cl.

| | |
|---|---|
| *H04L 12/26* | (2006.01) |
| *H04L 12/24* | (2006.01) |
| *H04L 41/0213* | (2022.01) |
| *H04L 43/12* | (2022.01) |
| *H04L 67/12* | (2022.01) |
| *H04L 12/40* | (2006.01) |
| *H04L 43/10* | (2022.01) |
| *H04L 67/125* | (2022.01) |
| *H04L 43/028* | (2022.01) |

(52) U.S. Cl.
CPC .............. *H04L 43/10* (2013.01); *H04L 43/12* (2013.01); *H04L 67/12* (2013.01); *H04L 67/125* (2013.01); *H04L 43/028* (2013.01)

(56) References Cited

U.S. PATENT DOCUMENTS

| | | | |
|---|---|---|---|
| 9,898,380 B1* | 2/2018 | Ball | G06F 11/221 |
| 2006/0215568 A1* | 9/2006 | Smith | H04L 43/12 |
| | | | 370/389 |
| 2007/0027589 A1* | 2/2007 | Brinkley | G08G 5/0013 |
| | | | 701/3 |
| 2008/0238759 A1* | 10/2008 | Carocari | G01S 13/785 |
| | | | 342/47 |
| 2011/0191223 A1* | 8/2011 | Singh | G06Q 30/04 |
| | | | 709/224 |
| 2015/0341677 A1* | 11/2015 | Petrisor | H04N 21/2146 |
| | | | 725/76 |
| 2018/0198704 A1* | 7/2018 | Viquez | H04L 69/22 |
| 2019/0068476 A1* | 2/2019 | Ranjit | H04L 43/0817 |

\* cited by examiner

COMMUNICATIONS NETWORK

The invention relates to a communication network, and more specifically a communication network for an aircraft.

BACKGROUND OF THE INVENTION

In the field of aeronautics, communications networks are used to support communications inside the aircraft, with such communications primarily providing for data exchange between the various avionics components.

Such communication networks include processing members (computers, processors . . . ) connected to the avionics and communicating with user terminals via switches for providing data exchange within the same processing member or between a processing member and a user terminal. For this purpose, the switches are so configured as to monitor and distribute the data frames of the various logical channels of the communication network concerned using configuration tables, with each configuration table containing the characteristics specific to the logical channels and to the output and input ports of a given switch.

To monitor the data frames of this type of communication network, a central computer is usually connected to the various switches of the communication network via specific dedicated ports of such switches. Such central computer is thus so configured as to monitor the information or a part of the information contained in the various logical channels of the communications network.

Therefore, this type of communication network has a relatively heavy architecture more particularly in that it includes a high number of connections to the central computer.

OBJECT OF THE INVENTION

One object of the invention is to provide a communication network having a simplified architecture.

BRIEF DESCRIPTION OF THE INVENTION

In order to achieve this goal, the invention provides for a communication network for an aircraft comprising at least one first processing member and a first switch which is connected to the first processing member in order to provide data exchange within the first processing member and/or between the first processing member and at least one user terminal remote from the first processing member and connected to the first switch.

According to the invention, the first switch comprises local means for observing logical communication channels of the first switch, and the first processing member includes means for controlling said observation means.

Thus, thanks to the particular structure of the communication network, the observation of logical channels and the contents thereof in said communication network is locally performed at the various switches and the associated processing members, which makes it possible to have a communication network with a reduced number of connections and computers, with the connection between the switch and the associated processing member being anyway required to provide the exchange of data within the processing member or to the outside.

Besides, such communication network architecture makes it possible to observe the operating communication network, i.e. when the communication network is operating, whereas the observed logical channels and also the unobserved logical channels are not, or little disrupted.

BRIEF DESCRIPTION OF THE DRAWINGS

The invention will be better understood upon reading the following description of the specific although not restrictive embodiments of the invention while referring to the appended figures wherein.

DETAILED DESCRIPTION OF THE INVENTION

Figure 1:
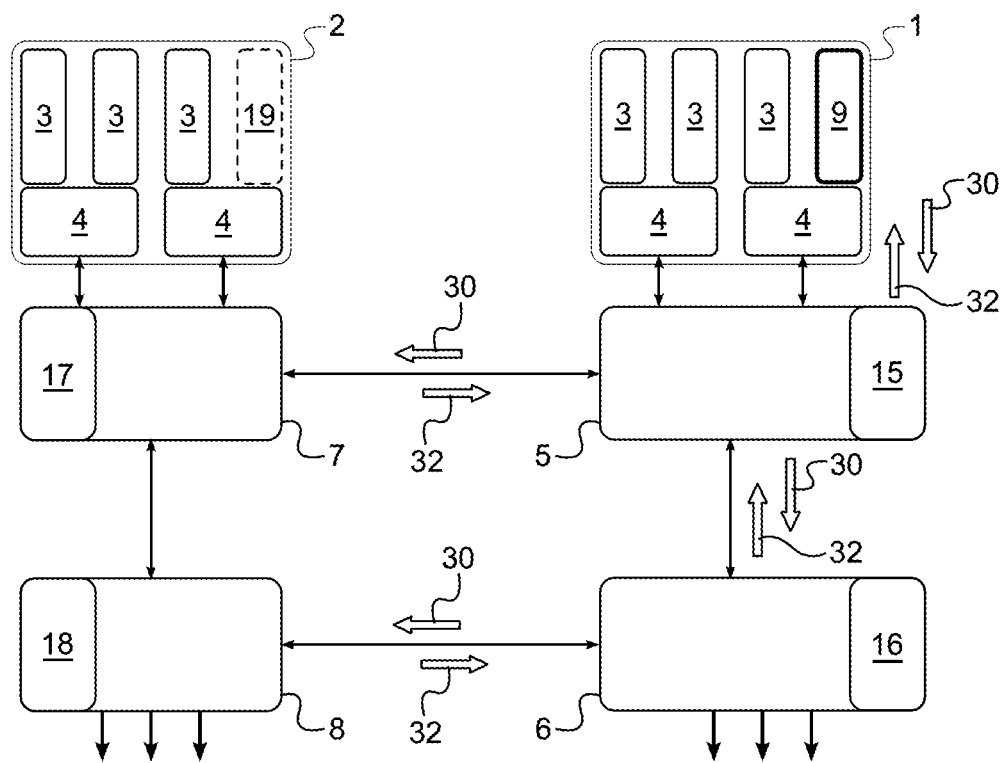
FIG. 1 schematically illustrates a communication network for an aircraft according to a first embodiment of the invention, FIG. 2 schematically illustrates a switch of the communication network shown in FIG. 1, FIG. 3 schematically illustrates a communication network for an aircraft according to a second embodiment of the invention, FIG. 4 schematically illustrates a switch of the communication network shown in FIG. 3.

Referring to FIG. 1, the communication network according to the first embodiment of the invention is a communication network for an aircraft.

The communication network here includes a first processing member 1 and a second processing member 2, with each one being associated with a separate avionics element of the aircraft (the avionics elements are not shown here). Each processing member 1, 2 is, for instance, a computer or a processor or a group of computers and/or processors. Each processing member 1, 2 hosts multiple avionics applications-functions 3 to be executed, and such applications-functions 3 are specific to a configuration given to the avionics element associated with the processing member concerned. Each processing member 1, 2 comprises, among others, connecting units 4, with each one being associated with one or more application(s)-function(s) 3 of the processing member concerned. The connection units 4 are here of the ARINC 664 P7 End System type.

The communication network also includes a first switch 5 and a second switch 6. The first switch 5 is connected, on the one hand, to the first processing member 1 and on the other hand, to the second switch 6 to control data exchanges between the various portions of the first processing member 1 and data exchange between said first processing member 1 and the second switch 6. The second switch 6 is in turn connected on the one hand to the first switch 5 and on the other hand to user terminals (not shown here) for controlling data exchange between the first switch 5 and the user terminals.

In addition, the communication network comprises a third switch 7 and a fourth switch 8. The third switch 7 is connected, on the one hand, to the second processing member 2 and on the other hand, to the fourth switch 8 to control data exchanges between the various portions of the second processing member 2 and data exchange between said second processing member 2 and the fourth switch 8. The fourth switch 8 is in turn connected on the one hand to the third switch 7 and on the other hand to user terminals for controlling data exchange between the third switch 7 and the user terminals.

The first switch 5 and the third switch 7 are preferably also connected to each other and the second switch 6 and the fourth switch 8 are also connected to each other.

This makes it possible to facilitate data exchange between the first processing member 1 and the second processing member 2.

The connection can equally be wired or wireless between the processing members 1, 2, the switches 5, 6, 7, 8 and the user terminals.

Figure 2:
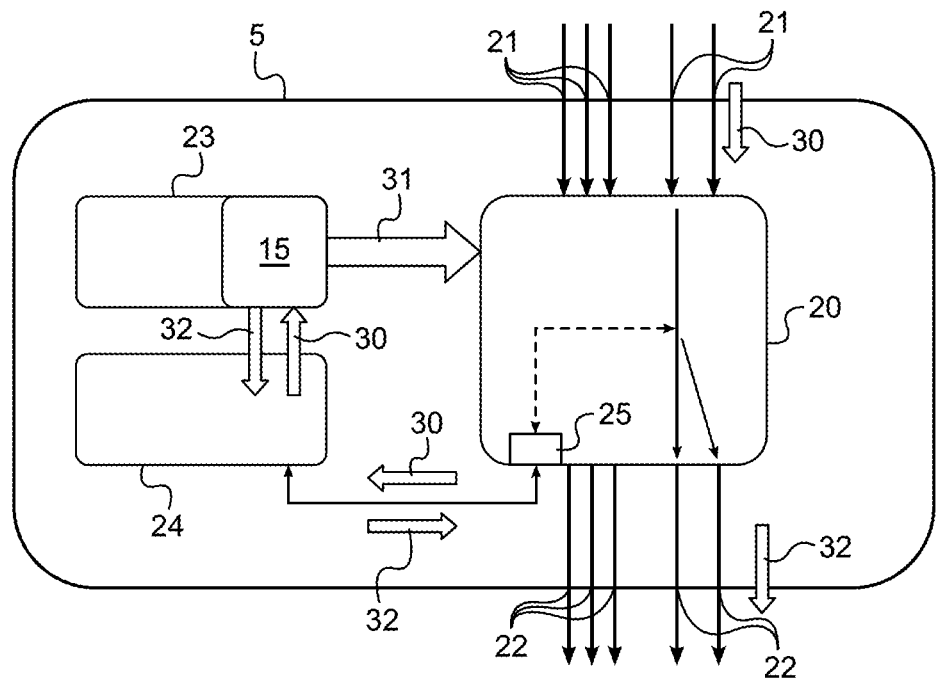

The first switch 5 will now be described with reference to FIG. 2. As the other three switches are identical to the first switch 5, this description also applies to the second switch 6, the third switch 7 and the fourth switch 8.

The first switch 5 comprises a router 20 for relaying the data frames between one or more input port(s) 21 of the first switch 5 and one or more output port(s) 22 of the first switch 5. This router 20 is for example of the Switch Engine type.

The first switch 5 also comprises a unit 23 for controlling the router 20 (such as a computer or a processor) and a unit 24 for connecting the router 20 to the control unit 23. An internal port 25 of the router 20 is thus connected here to the connection unit 24 for connecting the router 20 to the connection unit 24 which is also connected to the control unit 23. The connection unit 24 makes it possible to receive, to filter and to provide the control unit 23 with frames received via the port 25 (instructions, the frame of the logical channel to be observed . . . ). The connecting unit 24 does not make it possible to control the router 20 but to receive/transmit data frames.

In particular the control unit 23 comprises at least one first switch 5 configuration table, with said configuration table comprising several descriptors, with each descriptor containing the characteristics relating to a logical channel of the first switch 5 or the characteristics relating to an output port 22 of the first switch 5 or the characteristics relating to an input port 21 of the first switch 5.

The connection unit 24 is here of the ARINC 664 P7 End System type.

According to the invention, the first switch 5 includes local means 15 for observing the logical communication channels of the first switch 5.

The local observation means 15 are here arranged in the control unit 23 of the first switch 5. The local observation means 15 are so configured as to extract data to be monitored from information received by the router 23 control unit 20. The local observation means 15 are further so configured as to send the extracted data to the router 20 which is suitable for transferring such data into the communication network.

The first switch 5 is for instance a so-called A664 switch (i.e. based on the ARINC 664 standard) the original structure of which has been adapted so that the first switch 5 can include the above-mentioned dedicated local observation means 15.

Referring to FIG. 1, as the four switches are identical here, the first switch 5 therefore comprises the above-mentioned local means 15 for observing the logical communication channels of the first switch 5, the second switch 6 comprises second local means 16 for observing the logical communication channels of the second switch 6, the third switch 7 comprises third local means 17 for observing the logical communication channel 7 of the third switch and the fourth switch 8 comprises fourth local means 18 for observing the logical channels communication of the fourth switch 8.

In order to control such local observation means, the first processing member 1 comprises means for controlling the first local observation means 15, the second local observation means 16, the third means local observation 17 and the fourth local observation means 18.

Therefore, monitoring can be more dynamic and more complete since it can be applied to all the switches in the communication network.

More particularly, such control means comprise a specific application-function 9 to be executed which is specific to the different above-mentioned observation means. This specific application-function 9 is connected to one of the units 4 for connecting the first processing member 1. The connection unit 4 is assigned to this specific application-function 9 only or is associated with this specific application-function 9 and with one or more other function(s)-application(s) 3 of the first processing member 1.

To control the various local observation means and in order not to increase the number of connections in the communication network, the control means are preferably connected:

directly to the first local observation means 15 via the first switch 5 router, via the first switch 5 router and via the third switch 7 router to the third local observation means 17, via the first switch 5 router and via the second switch 6 router to the second local observation means 16, via the first switch 5 router, via the second switch 6 router and via the fourth switch 8 router to the fourth local observation means 18.

Advantage is thus taken of the existing connections within the communication network to observe the different logical channels.

The local observation means 15, 16, 17, 18 and the associated control means are preferably so arranged that monitoring is possible both for only one logical channel as well as for several logical channels at a time.

Specifically, for redundancy issues, the second processing member 2 also comprises means for controlling the first local observation means 15, the second local observation means 16, the third means local observation 17 and the fourth local observation means 18. Such control means 19 may be identical with those of the first processing member 1.

Thus, in case of failure of the first processing member 1 and/or the control means thereof, the means 19 for controlling the second processing member 2 can monitor the logical channels.

The monitoring of a logical channel of the communication network will now be described while referring to FIGS. 1 and 2.

The control means first generate, via the specific application-function 9, one instruction for monitoring a given logical channel. Such monitoring instruction specifically includes an indication of the logical channel to be monitored, an indication of the local observation means of the switch concerned by this logical channel and an indication of data to be retrieved about the logical channel. For example, in the header of the frame supporting the monitoring instruction are encoded on the one hand the identification of the logical channel and on the other hand IP, UDP information explicitly targeting the local observation means of the switch concerned by this logical channel so that the instruction can reach the right switch.

The connection unit 4 then translates this monitoring instruction into a format suitable for the switches as for example a SNMP (Simple Network Management Protocol) or TFTP (Trivial File Transfer Protocol) format and transmits same to the switches.

The translated instruction 30 reaches the router 20 at a switch concerned with the logical channel to be monitored and is transmitted to the local observation means via the connection unit 24. It should be noted that either the translated instruction 30 directly reaches the concerned switch (when the concerned switch is thus the first switch 5) or the translated instruction 30 is relayed by the various switches so as to reach the relevant switch(es) (when the concerned switch(es) is/are therefore among the second switch 6, the third switch 7 or the fourth switch 8).

Based on the name or the identification of the logical channel to be monitored, the local observation means generate one instruction of selection/deselection 31 to the router 20 in order to associate the logical channel to be monitored with the internal port 25 of the router 20. This instruction of selection/deselection 31 is directly provided by the local observation means 15 to the router 20 without going through the connection unit 24 again, since it is a local control.

For this purpose, one of the parameters of the descriptor associated with the logical channel to be monitored to add the internal port 25 to a diffusion profile of said logical channel, with such diffusion profile already including the output ports 22 of the switch on which said logical channel is to be diffused and one of the parameters of another descriptor associated with another logical channel is optionally modified to remove the internal port 25 from the diffusion profile of said other logical channel.

As a result, the control unit 23 acquires information on the logical channel to be monitored via the connection unit 24, and the local observation means extract the data to be retrieved according to the directions of the translated instruction 30.

Then, a response signal 32 containing the extracted data is transmitted to the router 20 via the connecting unit 24 and emitted over one or more output port(s) 22 of the switch concerned to the first processing member 1.

The connection unit 4 of the first processing member 1 receives the response signal 32, translates and transmits same to the control means.

The monitoring of a logical channel of the communication network is thus directly enabled at the switches.

Figure 3:
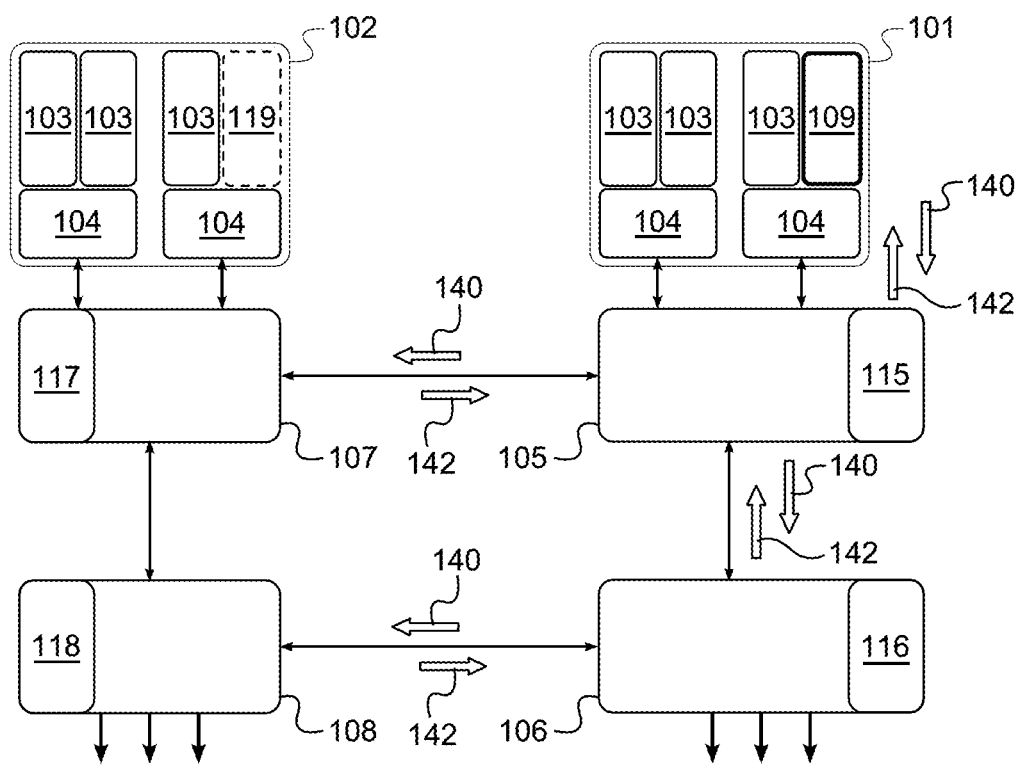
Figure 4:
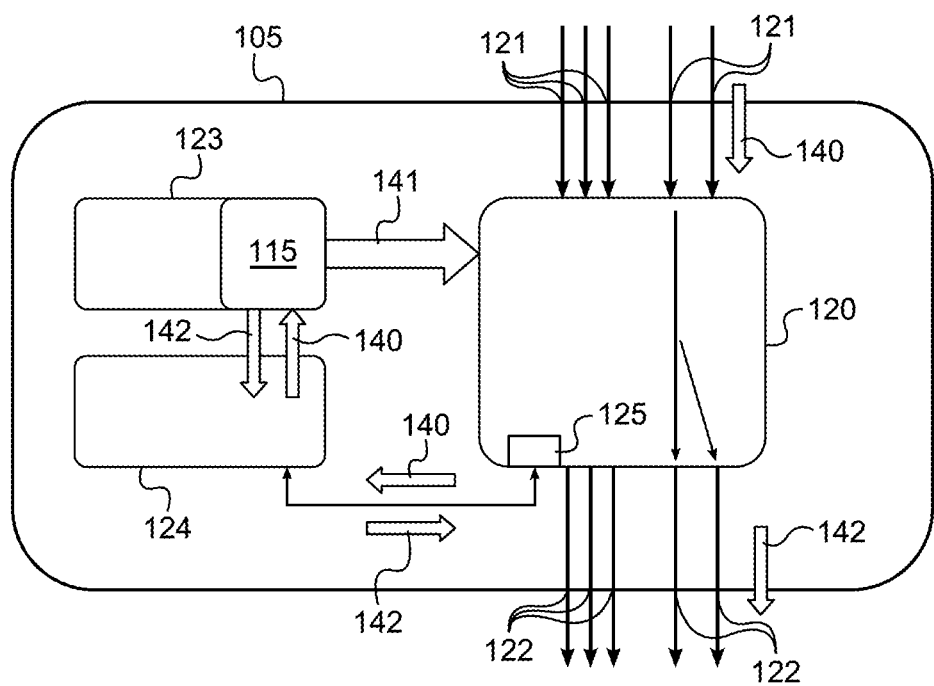

A second embodiment will now be described while referring to FIGS. 3 and 4.

In this second embodiment, the general structure of the communication network and of the various elements of the communication network (more particularly the switches and the processing members) is identical with that of the first embodiment. However, the local observation means and the associated control means are here so arranged as to be able to change the configurations of the logical channels associated with the different switches instead of being so arranged as to perform a simple monitoring of said logical channels as in the first embodiment. It should be noted that this reconfiguration is distinct from the simple selection/deselection of a router internal port in a diffusion profile of a descriptor associated to said router for monitoring a logical channel. As a matter of fact, reconfiguration focuses on modifying the configuration of one or more logical channel(s) so that the change in the configuration will impact the outside of the switch concerned by such logical channel(s).

The local observation means and the associated control means are preferably so arranged that a change in the configuration of a logical channel can concern at the same time the modification of one or more parameter(s) of the logical channel and/or the addition or removal of the logical channel to/from the communication network (it being understood that this addition or removal is purely fictitious and consists in temporarily using or no longer using the logical channel for the communications).

The local observation means and the associated control means are preferably so arranged that the reconfiguration is possible at several logical channels at a time and at a single logical channel at a time.

More specifically, the local observation means and the associated control means are so arranged as to be able not only to reconfigure the logical channels of the different switches but also to reconfigure the input and/or output ports of the different switches.

This makes it possible to more easily reconfigure the locations of the functions-applications 104 of the first processing member 101 and the second processing member 102 and/or the active/passive states of the different functions-applications 104 even in operational mode.

The reconfiguration of a logical channel of the communication network will now be described while referring to FIGS. 3 and 4.

The control means first generate, via the specific application-function 109, one instruction for reconfiguring a given logical channel. This reconfiguration instruction more particularly comprises one indication of the logical channel to be reconfigured, one indication of the local observation means of the switch concerned by this logical channel and one indication of the reconfiguration to be performed on that logical channel: either an identification of the target configuration to be reached over this logical channel or an identification of a configuration deviation to be applied to this logical channel, and one indication of data to be retrieved about such logical channel. For example, in the header of the frame supporting the reconfiguration instruction on the one hand the identification of the logical channel and on the other hand IP, UDP information explicitly targeting the local observation means of the switch concerned by this logical channel are encoded so that the instruction can reach the right switch.

The connection unit 104 then translates this reconfiguration instruction into a format suitable for the switches as for example a SNMP (Simple Network Management Protocol) or TFTP (Trivial File Transfer Protocol) format and transmits same to the switches.

The translated instruction 140 reaches the router 120 at a switch concerned with the logical channel to be reconfigured and is transmitted to the local observation means via the connection unit 124.

If the translated instruction 140 comprises one indication of a target configuration to be reached, then the local observation means determine the standard deviation with the current configuration and the target configuration to be reached and generate one instruction to modify the logical channel 141 concerned to the router 120 to apply this deviation to the descriptor(s) of this logical channel. This logical channel modification 141 is directly provided by the local observation means 115 to the router 120 without going through the connection unit 124 again, since it is a local control.

If the translated instruction 140 comprises an identification of a deviation in the configuration to be applied to the logical channel, then the local observation means directly generate one instruction to modify the logical channel 141 concerned to the router 120 to apply this deviation to the descriptor(s) of same logical channel.

When the instruction to modify the logical channel 141 comprises parameter change information, the logical channel modification instruction 141 causes a change in the parameters concerned in the descriptor(s) of the logical channel to be reconfigured. When the instruction to modify the logical channel 141 comprises information on the addition or removal of the logical channel to be reconfigured, the logical channel modification instruction 141 causes a change in the (active or inactive) state of the descriptor(s) of the logical channel to be reconfigured.

Consequently, the logical channel to be reconfigured is modified. In addition, a response signal 142 containing information on the current configuration of the logical channel to be reconfigured is generated by the local observations means and transmitted over one or more output port(s) 122 of the switch concerned to the first processing member 101.

The connection unit 104 of the first processing member 101 receives the response signal, translates and transmits same to the control means.

The control means and the local observation means are preferably so configured that the reconfiguration instruction is cyclically emitted by the control means and so that the response signal 142 is cyclically emitted by the local observation means.

The reconfiguration of a logical channel of the communication network is thus directly enabled at the switches.

The invention is not limited to what has just been described, but encompasses every alternative solution within the scope of the claims.

In particular, the communications network may have a different number of processing members.

For redundancy issues, each switch of the communication network may include another switch in parallel or several switches in parallel.

Although here the local observation means and the associated control means are so arranged as to be able to monitor the logical channels only or are so arranged as to be suitable to reconfigure the logical channels only, the local observation means and the associated means members may be so arranged as to not only monitor the logical channels but also to reconfigure the logical channels.

Although here all the switches of the communication network include local observation means, only one switch or a part of the switches may include local observation means. Besides, within the same communication network, the switches may have local observation means different from one switch to another (for instance, one part will comprise observation means only enabling the monitoring of the logical channels and another part will comprise observation means only enabling a reconfiguration of the logical channels).

The invention claimed is:

1. A communication network for an aircraft, comprising:
a first processing member;
a second processing member; and
a first switch which is connected to the first processing member in order to provide data exchange within the first processing member and/or between the first processing member and at least one user terminal remote from the first processing member and connected to the first switch, wherein the first switch observes a content of first information transmitted via first logical communication channels of the first switch and wherein the first processing member controls said first switch;
the first processing member being arranged to generate a first monitoring instruction comprising an indication of a logical channel to be monitored, an indication of a local observation means of the first switch, and an indication of data to be retrieved about the logical channel, the indication of the logical channel and information targeting the local observation means of the first switch being encoded in a header of a frame of the first monitoring instruction, and to transmit the first monitoring instruction to the first switch, the first switch being arranged to extract the data to be retrieved on the logical channel and to transmit these data to the first processing member; and
the second processing member being arranged to generate a second monitoring instruction comprising an indication of a logical channel to be monitored, an indication of a local observation means of the first switch, and an indication of data to be retrieved about the logical channel encoded in a header of a frame of the second monitoring instruction, the indication of the logical channel and information targeting the local observation means of the first switch being encoded in the header of the frame of the second monitoring instruction, and to transmit the second monitoring instruction to the first switch, the first switch being arranged to extract the data to be retrieved on the logical channel and to transmit these data to the second processing member.

2. The communication network according to claim 1, wherein the first switch comprises a router for relaying data frames between one or more input port of the first switch and one or more output port of the first switch, a processor that controls the router and a connection unit that connects the router to the control unit, with an internal port of the router being connected to the connection unit.

3. The communication network according to claim 2, wherein the processor of the first switch observes the content of the first information.

4. The communication network according to claim 3, wherein the processor of the first switch is so arranged as to be able to equally monitor both the content of the first information transmitted via one single first logical channel and the content of the first information transmitted via several first logical channels.

5. The communication network according to claim 1, wherein the processor of the first switch is so arranged as to be able to monitor the content of the first information transmitted via the first logical communication channels circulating on the first switch.

6. The communication network according to claim 1, wherein the processor of the first switch is so arranged as to be able to reconfigure the first logical communication channels circulating on the first switch.

7. The communication network according to claim 6, wherein the processor of the first switch is so arranged as to be able to equally reconfigure one single first logical channel at a time and several first logical channels at a time.

8. The communication network according to claim 6, wherein the processor of the first switch is so arranged that a configuration change of a first logical channel can relate at the same time to the modification of one or more parameter of the first logical channel and/or the addition or the removal of the first logical channel to/from the communication network.

9. The communication network according to claim 6, wherein the processor of the first switch is so arranged as to be able to also reconfigure input ports and/or output ports of the first switch.

10. The communication network according to claim 1, wherein
the first switch is connected to the first processing member in order to provide data exchange at least between the first processing member and at least one user terminal, and the second switch is connected to the second processing member in order to provide data exchange at least between the second processing member and at least one user terminal.

11. The communication network according to claim 1, wherein a second switch which is connected to the second processing member in order to provide data exchange within the second processing member and/or between the second processing member and at least one user terminal remote from the second processing member and connected to the second switch, with the second switch observes the content of second information transmitted via second logical communication channels of the second switch, each processing member being associated with a separate avionics element of the aircraft and hosting multiple avionics applications-functions to be executed, such applications-functions being specific to a configuration given to the avionics element associated with the processing member concerned.

12. The communication network according to claim 11, wherein the first processing member is so configured as to also control the second switch.

13. The communication network according to claim 12, wherein the first processing member is so arranged as to be directly connected to the first switch and to be connected to the second switch via the first switch.

14. The communication network according to claim 11, wherein the first switch and the second switch are connected to each other.

15. The communication network according to claim 11,
wherein the first and second monitoring instructions each include an indication of a local observation means of the second switch for reconfiguration encoded in a header of a frame of the logical channel, and
wherein when an instruction to modify the logical channel comprises parameter change information, the logical channel is reconfigured based on the indication of the local observation means of the second switch.

16. A communication network for an aircraft, comprising:
at least one first processing member;
a first switch which is connected to the first processing member in order to provide data exchange within the first processing member and/or between the first processing member and at least one user terminal remote from the first processing member and connected to the first switch, wherein the first switch observes a content of first information transmitted via first logical communication channels of the first switch and wherein the first processing member controls said first switch, the first processing member being arranged to generate a first monitoring instruction comprising an indication of a logical channel to be monitored, an indication of a local observation means of the first switch, and an indication of data to be retrieved about the logical channel, the indication of the logical channel and information targeting the local observation means of the first switch being encoded in a header of a frame of the first monitoring instruction, and to transmit the first monitoring instruction to the first switch, the first switch being arranged to extract the data to be retrieved on the logical channel and to transmit these data to the first processing member;
at least one second processing member; and
a second switch which is connected to the second processing member in order to provide data exchange within the second processing member and/or between the second processing member and at least one user terminal remote from the second processing member and connected to the second switch, wherein the second switch observes a content of second information transmitted via second logical communication channels of the second switch and wherein the second processing member controls said second switch, the second processing member being arranged to generate a second monitoring instruction comprising an indication of a logical channel to be monitored, an indication of a local observation means of the second switch, and an indication of data to be retrieved about the logical channel encoded in a header of a frame of the second monitoring instruction, the indication of the logical channel and information targeting the local observation means of the second switch being encoded in the header of the frame of the second monitoring instruction, and to transmit the second monitoring instruction to the second switch, the second switch being arranged to extract the data to be retrieved on the logical channel and to transmit these data to the second processing member,
each processing member being associated with a separate avionics element of the aircraft and hosting multiple avionics applications-functions to be executed, such applications-functions being specific to a configuration given to the avionics element associated with the processing member concerned,
wherein at least the first processing member comprises an application-function to be executed which is specific to the first switch observing the content of first information transmitted via first logical communication channels of the first switch.

17. A communication network for an aircraft, comprising:
at least one first processing member;
a first switch which is connected to the first processing member in order to provide data exchange within the first processing member and/or between the first processing member and at least one user terminal remote from the first processing member and connected to the first switch, wherein the first switch observes a content of first information transmitted via first logical communication channels of the first switch and wherein the first processing member controls said first switch, the first processing member being arranged to generate a first monitoring instruction comprising an indication of a logical channel to be monitored, an indication of a local observation means of the first switch, and an indication of data to be retrieved about the logical channel, the indication of the logical channel and information targeting the local observation means of the first switch being encoded in a header of a frame of the first monitoring instruction, and to transmit the first monitoring instruction to the first switch, the first switch being arranged to extract the data to be retrieved on the logical channel and to transmit these data to the first processing member;
at least one second processing member; and
a second switch which is connected to the second processing member in order to provide data exchange within the second processing member and/or between the second processing member and at least one user terminal remote from the second processing member and connected to the second switch, wherein the second switch observes a content of second information transmitted via second logical communication channels of the second switch and wherein the second processing member controls said second switch, the second processing member being arranged to generate a second monitoring instruction comprising an indication of a logical channel to be monitored, an indication of a local observation means of the second switch, and an indication of data to be retrieved about the logical channel encoded in a header of a frame of the second monitoring instruction, the indication of the logical channel and information targeting the local observation means of the second switch being encoded in the header of the frame of the second monitoring instruction, and to transmit the second monitoring instruction to the second switch, the second switch being arranged to extract the data to be retrieved on the logical channel and to transmit these data to the second processing member, each processing member being associated with a separate avionics element of the aircraft and hosting multiple avionics applications-functions to be executed, such applications-functions being specific to a configuration given to the avionics element associated with the processing member concerned, wherein the first processing member is so configured as to also control the second switch, wherein at least the first processing member comprises a first application-function to be executed which is specific to the first switch observing the content of first information transmitted via first logical communication channels of the first switch and a second application-function to be executed which is specific to the second switch observing the content of second information transmitted via second logical communication channels of the second switch.

18. A communication network for an aircraft, comprising:

at least one first processing member;

a first switch which is connected to the first processing member in order to provide data exchange within the first processing member and/or between the first processing member and at least one user terminal remote from the first processing member and connected to the first switch, wherein the first switch observes a content of first information transmitted via first logical communication channels of the first switch and wherein the first processing member controls said first switch, the first processing member being arranged to generate a first monitoring instruction comprising an indication of a logical channel to be monitored, an indication of a local observation means of the first switch, and an indication of data to be retrieved about the logical channel, the indication of the logical channel and information targeting the local observation means of the first switch being encoded in a header of a frame of the first monitoring instruction, and to transmit the first monitoring instruction to the first switch, the first switch being arranged to extract the data to be retrieved on the logical channel and to transmit these data to the first processing member;

at least one second processing member; and a second switch which is connected to the second processing member in order to provide data exchange within the second processing member and/or between the second processing member and at least one user terminal remote from the second processing member and connected to the second switch, wherein the second switch observes a content of second information transmitted via second logical communication channels of the second switch and wherein the second processing member controls said second switch, the second processing member being arranged to generate a second monitoring instruction comprising an indication of a logical channel to be monitored, an indication of a local observation means of the second switch, and an indication of data to be retrieved about the logical channel encoded in a header of a frame of the second monitoring instruction, the indication of the logical channel and information targeting the local observation means of the second switch being encoded in the header of the frame of the second monitoring instruction, and to transmit the second monitoring instruction to the second switch, the second switch being arranged to extract the data to be retrieved on the logical channel and to transmit these data to the second processing member, each processing member being associated with a separate avionics element of the aircraft and hosting multiple avionics applications-functions to be executed, such applications-functions being specific to a configuration given to the avionics element associated with the processing member concerned, wherein the first processing member is so configured as to also control the second switch, wherein the first processing member is so arranged as to be directly connected to the first switch via a router of this first switch and to be connected to the second switch via said first switch router and also router of the second switch.

\* \* \* \* \*